UNITED STATES PATENT OFFICE.

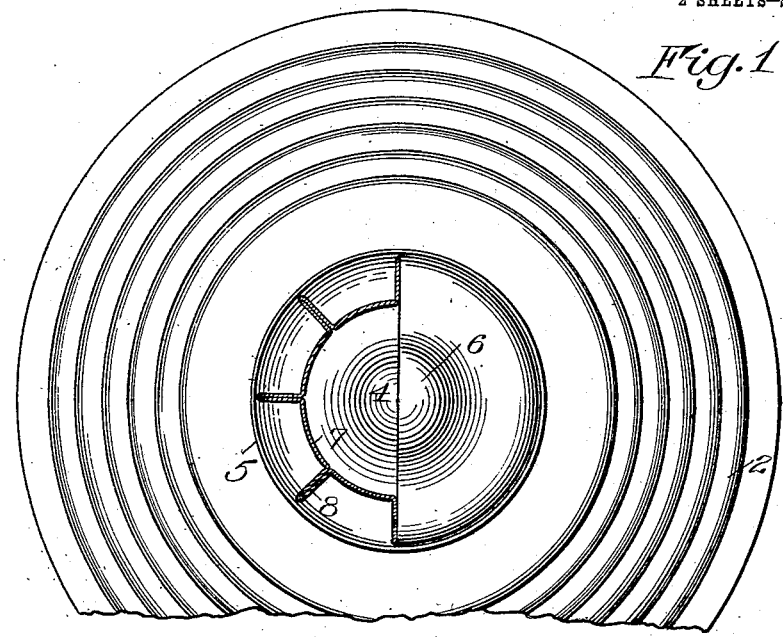
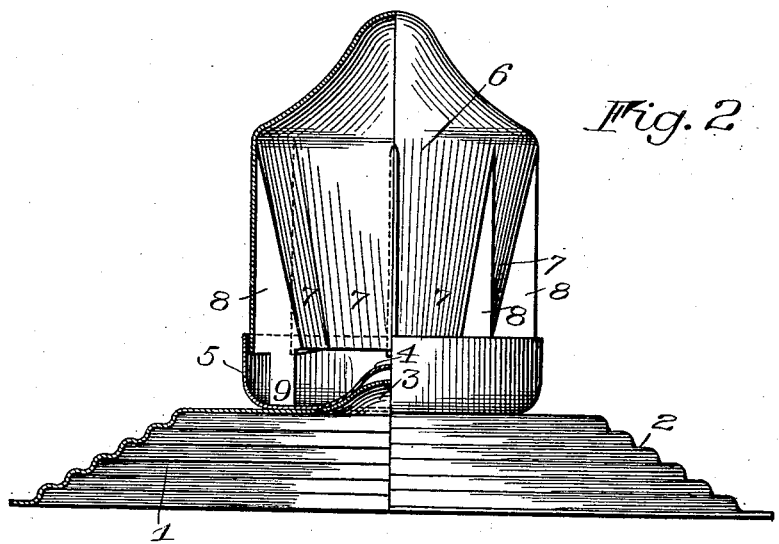

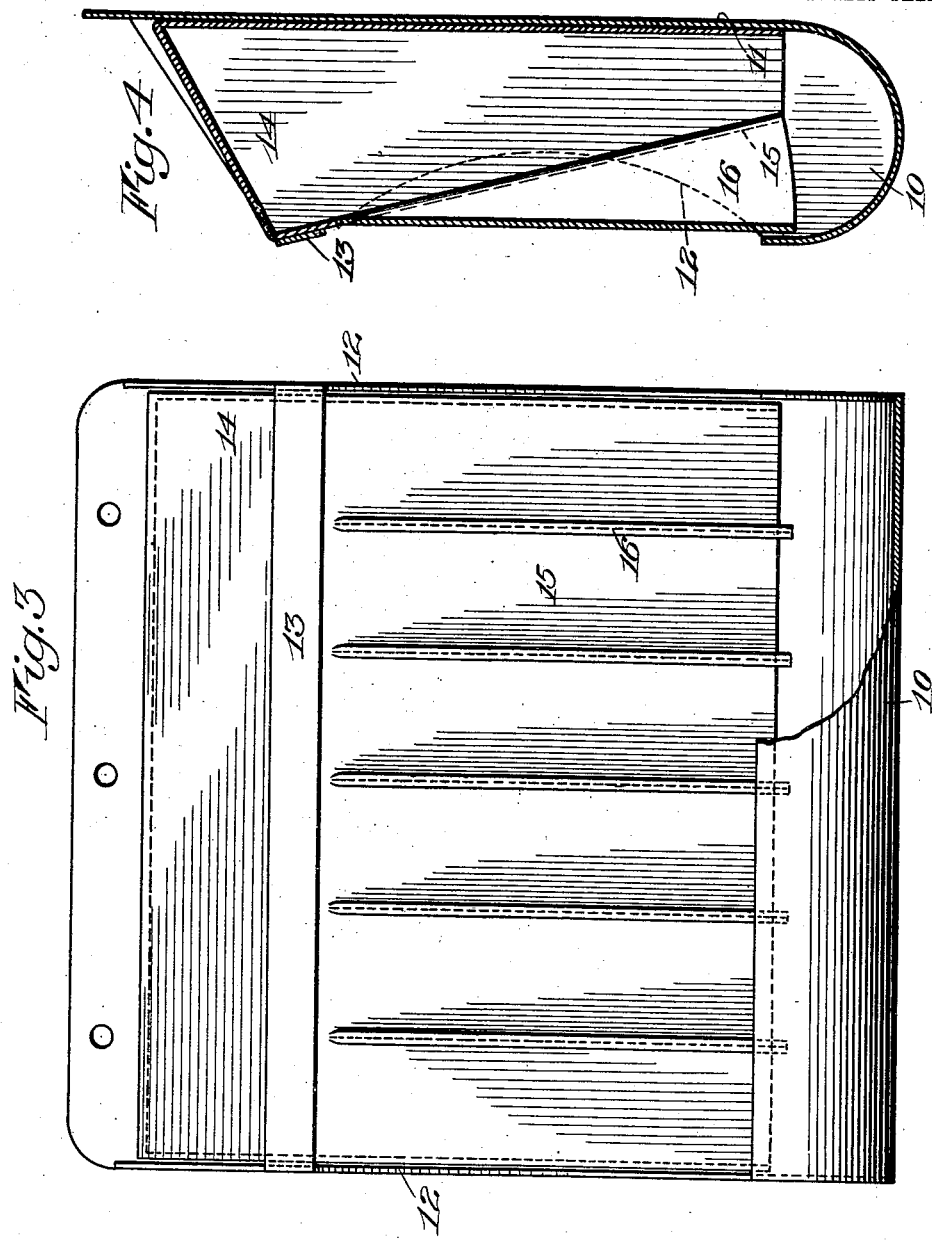

HENRY E. SIDDONS, OF ROCHESTER, NEW YORK.

FEEDER FOR LIVE STOCK.

1,070,850.  Specification of Letters Patent.  Patented Aug. 19, 1913.

Application filed November 4, 1911. Serial No. 658,504.

*To all whom it may concern:*

Be it known that I, HENRY E. SIDDONS, of Rochester, in the county of Monroe and State of New York, have invented certain new and useful Improvements in Feeders for Live Stock; and I do hereby declare the following to be a full, clear, and exact description of the same, reference being had to the accompanying drawings, forming a part of this specification, and to the reference-numerals marked thereon.

The present invention relates to feeders for live stock, and it has for its object to provide a novel construction especially adapted for supplying poultry with food or water.

A further object of my invention is to arrange the parts of the device in such a manner that they may be readily separated when the container is to be filled, and to enable the device to be kept in a perfectly sanitary condition.

Another object of the invention is to provide a construction that can be readily manufactured from sheet metal, and one which is extremely efficient for proper feeding of live stock or chickens so that they are able to obtain the food or water as they require it, and, at the same time, are prevented from getting into the receptacle or contaminating its contents.

Another object of the invention is to afford separate feeding apartments for the chickens, a convenient support for them to stand on while feeding, and also to support the feeder at a sufficient elevation to prevent foreign matter from getting into the device.

To these and other ends the invention consists in certain improvements and combinations of parts all as will be hereinafter more fully described, the novel features being pointed out in the claims at the end of the specification.

In the drawings: Figure 1 is a top plan view, showing a portion in horizontal section, of a preferred embodiment of my invention; Fig. 2 is a side elevation, with a portion in vertical section; Fig. 3 is a plan view, with a part broken away, of a modified form of the invention, and Fig. 4 is a vertical sectional view of the construction shown in Fig. 3.

Similar reference numerals throughout the several figures indicate the same parts.

In the present embodiment of the invention, with reference particularly to the preferred form, shown in Figs. 1 and 2, I may employ a base 1 preferably formed of sheet metal and provided with a series of steps or ridges such as the annular corrugations 2, up which the chickens or stock may walk, and on which they may stand, to reach a proper feeding position. The base and receptacle are provided with coöperating projections for holding the latter centrally on the former, and in the drawings the base 1 is shown provided at its top with a central projection 3, preferably rounded or dome-shaped, coöperating with a depression 4 in the receptacle 5.

Arranged within the receptacle 5 is a container 6, which serves to retain the feed or water in proper relation to the edge of the receptacle and in position to be reached by the live stock or chickens. The container is a hollow body preferably in the form of an inverted truncated cone comprising an annular wall 7 inclined downwardly and inwardly and surrounded with a series of vertically extending division walls. The latter are in the form of ribs 8 which are preferably formed integrally with the wall 7 from a single blank of sheet metal by the use of suitable dies. The ribs 8 project outwardly from the inclined wall of the container, their lower ends preferably being arranged adjacent to and slightly below the upper edge of the receptacle 5, as shown in Fig. 2. The container may be supported within the receptacle in any convenient manner, and in the present embodiment I have provided legs 9 which may be integral with the sheet of metal from which the container is formed and project downwardly from any convenient points on the edge of said sheet.

In the arrangement of the parts shown, the receptacle is divided into a series of troughs by the ribs or partitions 8, which serve to prevent the live stock or chickens from stepping into or standing in the receptacle, and an equal distribution of the contents of the container into all parts of the receptacle is assured as the latter is emptied. It will also be noticed that the depression 4 in the bottom of the receptacle being arranged centrally therein performs a dual function since it produces an inclined surface within the receptacle serving to distribute the feed passing downwardly from the container toward the edges of the receptacle.

In the modification shown in Figs. 3 and 4, the same principle of construction is applied to a feeder adapted to be suspended from a wall or other support. It comprises a receptacle 10 which is carried by and preferably formed integral with the wall plate 11, and end walls 12, which latter are connected by a strap 13 at their upper and outer corners. The container, designated at 14, comprises a back wall, ends and top plate and inclined front wall 15. It is supported by engaging the wall plate 11 and the strap 13 so that it is suspended above the receptacle 10 with its open lower end or mouth projecting slightly beneath the front edge of the receptacle. The front wall of the container is inclined downwardly and rearwardly toward the back wall and is provided with forwardly extending ribs or partitions 16, preferably formed by the stamping operations necessary to make the container from a single blank of sheet metal. The ribs or partitions 16 project forwardly from the inclined front wall 15 of the holder, and extend vertically, their lower ends terminating at points adjacent to and slightly beneath the front edge of the receptacle 10.

While I have shown my invention as applied in two preferred embodiments, it is to be understood that I am not limited to the precise arrangement and construction herein disclosed, but may adopt other modifications and changes without departing from the spirit and scope of my improvements.

I claim as my invention:

1. In a feeder, the combination with a receptacle, of a removable container having a closed top and an open bottom whereby it may be filled by being inverted, said container being supported above the receptacle and including an inclined wall extending to a point below the top of the receptacle, the wall being formed from a single blank of sheet metal and provided with integral partitions, comprising double thicknesses of metal having contact with each other the lower ends of the partitions lying adjacent to the upper edge of the receptacle.

2. In a feeder, the combination with a receptacle, of a removable container having a closed top and an open bottom whereby it may be filled by being inverted, said container being supported above the receptacle and including an inclined wall extending to a point below the top of the receptacle, the wall having a plurality of partitions formed integral therewith and comprising double thicknesses of metal and extending vertically to points near the top and bottom of the container, the lower ends of said partitions being adjacent to the upper edge of the receptacle.

3. In a feeder, the combination with a receptacle, of a removable container having a closed top and an open bottom whereby it may be filled by being inverted, said container being supported above the receptacle and including an inclined wall extending to a point below the top of the receptacle, the wall being formed from a single blank of sheet metal and provided with vertically extending partitions formed integral therewith and comprising double thicknesses of metal, the lower ends of which lie adjacent to and beneath the upper edge of the receptacle.

4. In a feeder, the combination with a receptacle, of a removable container substantially in the form of an inverted truncated cone and having a closed top and an open bottom whereby it may be filled by being inverted, the container being supported above the receptacle and including a wall provided with a plurality of partitions formed integral therewith and comprising double thicknesses of metal and extending vertically to points near the top and bottom respectively, the lower ends of the partitions being adjacent to the upper edge of the receptacle.

5. In a feeder, the combination with a receptacle, of a removable container in substantially the form of an inverted truncated cone having a closed top and an open bottom whereby it may be filled by being inverted, the container being supported above the receptacle and comprising a wall formed from a single blank of sheet metal having a plurality of vertically extending partitions formed integral therewith and comprising double thicknesses of metal, the lower ends of the partitions lying adjacent to and beneath the upper edge of the receptacle.

6. In a feeder, the combination with a base and a receptacle, one of said parts being provided with a depression and the other having a projection coöperating therewith, of a container having the form of an inverted truncated cone supported above the receptacle, the wall of the container being provided with a plurality of vertically extending partitions, the lower ends of which lie adjacent to the upper edge of the receptacle.

7. In a feeder, the combination with a base having a projection arranged centrally of its top and a stepped portion at the edge of the top, of a receptacle having a depression adapted to engage said projection, and a container having the form of an inverted truncated cone supported above the receptacle, the wall of the container being provided with a plurality of vertically extending partitions, the lower ends of which lie adjacent to the upper edge of the receptacle.

8. A live stock feeder comprising a receptacle and a removable container having a closed top and open bottom whereby it may be filled by being inverted, said container having a wall inclined inwardly away from the edge of the receptacle, and vertical partitions formed integral with and projecting from said wall into proximity with the edge of the receptacle and comprising double thicknesses of metal in contact with each other.

9. In a feeder, the combination with a circular base having an elevated central portion and provided with circular steps leading thereto, of a food receptacle mounted upon said central portion, the latter and the receptacle being provided one with a depression and the other with a coöperating projection for holding the receptacle centrally on said base.

10. A live stock feeder comprising a receptacle and a removable container, said container embodying a wall inclined from the top downwardly and inwardly away from the edge of the receptacle, the container being formed from a single blank of sheet metal and provided with integral partitions comprising double thicknesses of metal having contact with each other.

HENRY E. SIDDONS.

Witnesses:
RUSSELL B. GRIFFITH,
FLORENCE E. FRANCK.

---

Copies of this patent may be obtained for five cents each, by addressing the "Commissioner of Patents, Washington, D. C."